[11] 3,617,912

| | | | |
|---|---|---|---|
| [72] | Inventor | Stewart E. Miller<br>Middletown Township, Monmouth County, N.J. | |
| [21] | Appl. No. | 813,425 | |
| [22] | Filed | Apr. 4, 1969 | |
| [45] | Patented | Nov. 2, 1971 | |
| [73] | Assignee | Bell Telephone Laboratories Incorporated<br>Murray Hill, N.J. | |

[54] TRAVELING WAVE PARAMETRIC DEVICES WITH DISTRIBUTED COUPLING OF MORE THAN A SINGLE PUMP
10 Claims, 3 Drawing Figs.

[52] U.S. Cl. .................................................. 330/4.6,
307/88.3, 330/5
[51] Int. Cl. ................................................... H03f 7/04
[50] Field of Search .......................................... 330/4.5,
4.6, 4.8, 4.9; 307/88.3

[56] References Cited
UNITED STATES PATENTS

| | | | |
|---|---|---|---|
| 3,130,322 | 4/1964 | Spacek | 330/4.9 |
| 3,175,164 | 3/1965 | Schreiner | 330/4.9 |
| 3,187,192 | 6/1965 | Nalos | 330/4.6 |
| 3,205,370 | 9/1965 | Aslkin et al. | 330/4.6 |
| 3,293,447 | 12/1966 | Fleming | 330/4.9 |
| 3,293,557 | 12/1966 | Denton | 330/4.6 |
| 3,297,875 | 1/1967 | Garwin et al. | 330/4.6 |
| 3,299,365 | 1/1967 | Hooper et al. | 330/4.8 |
| 3,346,741 | 10/1967 | Mayer et al. | 330/4.5 |

*Primary Examiner*—Roy Lake
*Assistant Examiner*—Darwin R. Hostetter
*Attorneys*—R. J. Guenther and Arthur J. Torsiglieri ABSTRACT: Described herein optical traveling wave parametric devices with distributed coupling in nonlinear solid waveguide media, to which more than a single pump frequency is applied. In order to satisfy simultaneously the parametric relation involving frequencies and the parametric relation involving wave propagation constants, at least one of these pumps has a controllably variable frequency or a controllably variable component of propagation constant along the direction of propagation of the other pump. This invention is especially useful for optical parametric amplification or frequency conversion.

PATENTED NOV 2 1971 3,617,912

INVENTOR
S. E. MILLER
BY *D. Caple*
ATTORNEY

TRAVELING WAVE PARAMETRIC DEVICES WITH DISTRIBUTED COUPLING OF MORE THAN A SINGLE PUMP

Field of the Invention

This invention relates to electromagnetic parametric devices, especially those involving waveguided traveling waves in a nonlinear medium.

Background of the Invention

Parametric devices, involving such processes as the amplification or frequency conversion of an incoming electromagnetic wave, are especially useful where low noise operation is desired without the need for cryogenic temperatures. In a nonlinear medium, such as in response to wave energy in the optical region of the electromagnetic spectrum, traveling wave type of parametric device operation with distributed coupling is especially useful. By a nonlinear medium is meant a medium which exhibits the phenomenon of a nonlinear response to electric or magnetic fields. For example, a crystal in the potassium tantalate niobate ("KTN") system is "parabolic" (i.e., second-order or quadratic) in its dielectric tensor response to electric fields. Thus, due to such nonlinearity, the refractive index of a traveling electromagnetic wave in bulk KTN depends upon applied DC electric fields, for example. Moreover, again due to this nonlinearity, the presence of a single wave in bulk KTN gives rise to second harmonic generation therein, while the presence therein of two waves or more gives rise to "mixing" of these waves to produce sum and difference frequencies. Moreover, in general, any nonlinearity in response to electromagnetic waves can be utilized for any of the various parametric processes, by adjusting the various relative intensities of the input waves fed into the nonlinear medium.

In the case of traveling waves in a nonlinear medium, the parametric relations ("Tien conditions") require that the pump, signal, and "idler" waves satisfy certain relationships, one involving the respective frequencies, and the other involving the wave propagation constants. However, due to the inherent relationship in bulk material between each frequency and the magnitude of each propagation constant (i.e., the refractive index in bulk material), it is not always possible to find an "idler" which simultaneously satisfies all the above-mentioned parametric relations for a given signal and pump. Therefore, parametric processes involving traveling waves generally presents the problem of simultaneously satisfying all the aforementioned parametric relations, in order to achieve successful parametric operation. However, traveling wave distributed parametric devices have the advantage over lumped element devices in that the nonlinear medium need not be restricted to third or higher order nonlinearity.

SUMMARY OF THE INVENTION

According to a feature of this invention, independent control over the wave propagation constant at a given frequency is achieved by means of guiding the various waves involved in a solid waveguide medium, such as a dielectric rod, instead of using bulk material. Thereby, the propagation constants can be made different from those of bulk material. In U.S. Pat. No. 3,430,061 issued on Feb. 25, 1969 to G. E. Smith, there is described in greater detail the mechanism of waveguide control over the effective propagation constants, in a somewhat different context. Briefly, the profile of refractive index transverse to the direction of propagation of a wave in a medium determines the effective propagation constant.

For even greater flexibility and control, in order to satisfy the parametric relations, more than a single pump is used in the input to the dielectric rod, at least one of which pumps in one embodiment of this invention is controllably variable in frequency. For example, whereas the signal and one of the pumps are in the optical range (laser sources); at least one of the other pumps is in the gigahertz region of the spectrum, utilizing a source which is easily and controllably variable in frequency. In another embodiment of this invention, the aforementioned greater flexibility and control is achieved by having a second pump wave in the optical region fed into the waveguide such that this pump propagates therein at a controllably variable angle with respect to the propagation direction of the first pump wave in the waveguide. Thereby, the parametric relations can be satisfied simultaneously, by reason of the resulting controllably variable spatial periodicity of distributed coupling in the medium produced by the second pump.

BRIEF DESCRIPTION OF THE DRAWINGS

This invention, together with its features, advantages, and objects may be better understood in view of the following detailed description when read in conjunction with the drawing in which.

DETAILED DESCRIPTION

Figure 1:
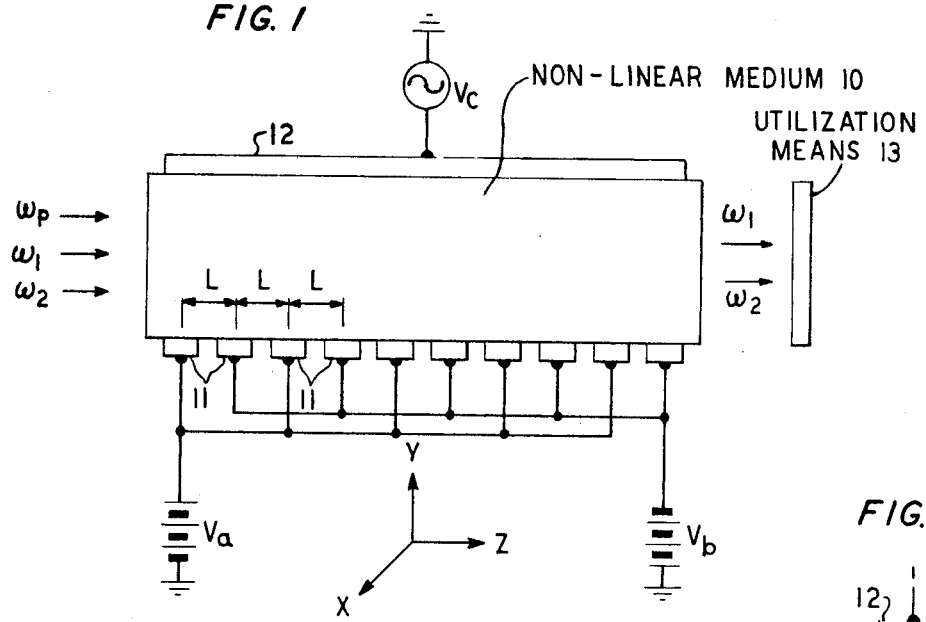
FIG. 1 is a schematic side view of a parametric device according to one embodiment of this invention.
Figure 2:
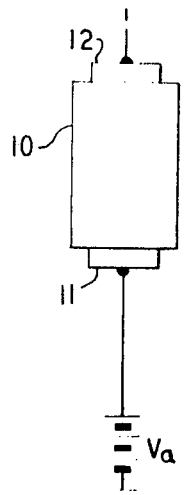
FIG. 2 is an end view of the device shown in FIG. 1.

FIG. 1 shows a centrosymmetric nonlinear crystal medium 10 in the form of a rectangular dielectric rod which is arranged for parametric operation in accordance with a specific embodiment of this invention. The pump wave, from a laser source (not shown) of angular frequency $\omega_p$, is fed into the left-hand end of the nonlinear medium 10. Advantageously, the geometric boundaries and the profile of the y component of the gradient in the refractive index of this medium 10 are designed to furnish a significant waveguiding effect upon this pump wave $\omega_p$ in the medium. See, for example, George C. Southworth, Principles and Applications of Waveguide Transmission, D. Van Nostrand Inc. (1950), Sections 5.7 and 10.3. Electrodes 11 are situated proximate to one side of the medium 10, advantageously in physical contact thereto as shown in the cross section view in FIG. 2. These electrodes 11 are all spaced a distance L from center to center of nearest neighbor. Moreover, the space between next neighboring electrodes 11 is small compared with L. On the opposite side of the medium 10, the single electrode 12 is situated; but this electrode 12 runs along almost the entire length of the medium 10 opposite all the electrodes 11.

Alternate electrodes 11 are connected to the DC voltage source $V_a$, and the remainder of the electrodes 11 are connected to the DC voltage source $V_b$. Advantageously, $V_a$ is equal in magnitude to $V_b$, but is opposite in algebraic sign. Electrode 12 is connected to the AC voltage source $V_c$ having an angular frequency equal to $\omega_c$. Advantageously, this source $V_c$ is designed so that the frequency $\omega_c$ can be continuously and controllably varied over a wide range of frequencies.

The voltage sources $V_a$, $V_b$, and $V_c$ set up corresponding electric fields in the medium 10, which are perpendicular to the z direction. Due to the nonlinearity of the medium 10, these electric fields can distributively couple with any electric fields associated with any electromagnetic waves present in the medium 10, such as with the electric field associated with the pump electromagnetic wave $\omega_p$. Thus, for any electromagnetic wave propagating along the z direction, the nonlinear material in the medium 10 furnishes an electro-optic interaction between this wave and the electric fields set up by $V_a$, and $V_b$, and $V_c$ such that there exits a coefficient of coupling between them having a spatially periodicity with a significant Fourier component $C$ of the form:

$$C \approx \cos(k_n z) \cos(\omega_c t) \quad (1)$$ wherein:

$$k_n = (2n+1) p/L, \quad (2)$$ with $$n = 0, 1, 2, 3 \ldots \quad (3)$$

The spatial periodicity furnished by the electrodes 11, in combination with the electrode 12 and the voltages $V_a$ and $V_b$, is of the square wave type. Hence, there are present in the ideal case just described only the odd spatial harmonics in the Fourier analysis of the coupling coefficient C, as indicated in Eq. (2) above. In general, however, for more complicated electrode structures and applied voltage configurations, the even spatial harmonics can also be present in the Fourier analysis of a periodic structure; so that more generally $k_n$ will also contain these even harmonics, as is well understood in the art.

An optical signal wave to be amplified, having an angular frequency $\omega_1$, and the optical first pump wave of frequency $\omega_p$ are both incident upon the left-hand end of the medium 10. For example, the medium 10 is made of potassium tantalate niobate (KTN), which exhibits an appreciable parabolic nonlinear electro-optic effect. The refractive index profile, in all directions transverse to the z direction, is a constant except for a discontinuity at the geometric boundary of the medium. The sources $V_a$, $V_b$, and $V_c$ together supply a second pump wave, according to this invention. The standing wave pattern of electric field intensity set up by these sources is equivalent to two traveling waves in opposite directions parallel to the $\pm z$ axis. The effective wave propagation constants $k_p$, $k_1$, and $k_2$ in the crystal 10, of the first pump wave, the signal wave, and the idler wave, respectively, will be determined not only by the refractive indices in bulk material of the medium 10 at the respective frequencies, but also by the waveguiding effect of the geometry of this medium. See Southworth, loc. cit. The idler wave of angular frequency $\omega_2$, with wave propagation constant $k_2$, will be generated within the medium 10. Amplification of the signal wave can take place, provided there exists such an idler waver satisfying the following equations:

$$\omega_1 + \omega_2 = \omega_p \pm \omega_c \quad (4)$$ and $$k_1 + k_2 = k_p \pm k_n \quad (5)$$

Varying the frequency $\omega_c$ of the source $V_c$ affords a simple means for providing the flexibility useful in satisfying these eqs. (4) and (5) simultaneously. It should be noted that eqs. (4) and (5) represent the parametric relations for mutual and distributed coupling in the medium 10, in the presence of the two pumps, $\omega_p$ and $\omega_c$. The DC electric field in the y direction, produced by the voltage sources $V_a$ and $V_b$ applied to the electrodes 11 and to the electrode 12, has a spatial periodicity in the z direction, thus giving rise to $k_n$ in eq. (5). The AC voltage source $V_c$ gives rise to $\omega_c$.

It is feasible to operate the device shown in FIG. 1 in the absence of any DC voltages $V_a$ and $V_b$. In such cases, the above parametric relations (4) and (5) are still satisfied, but with the omission of the term $k_n$ in (5).

Typically, the frequency $\omega_c$ of the AC source $V_c$ is of the order of either the microwave or the submillimeter range of frequency; and the source $V_c$ provides an additional effective pump of frequency $\omega_c$. Thereby, amplification of the signal frequency $\omega_1$ in the crystal 10 can take place even in cases where attenuation of the signal would otherwise occur in the absence of this voltage source $V_c$.

Figure 3:
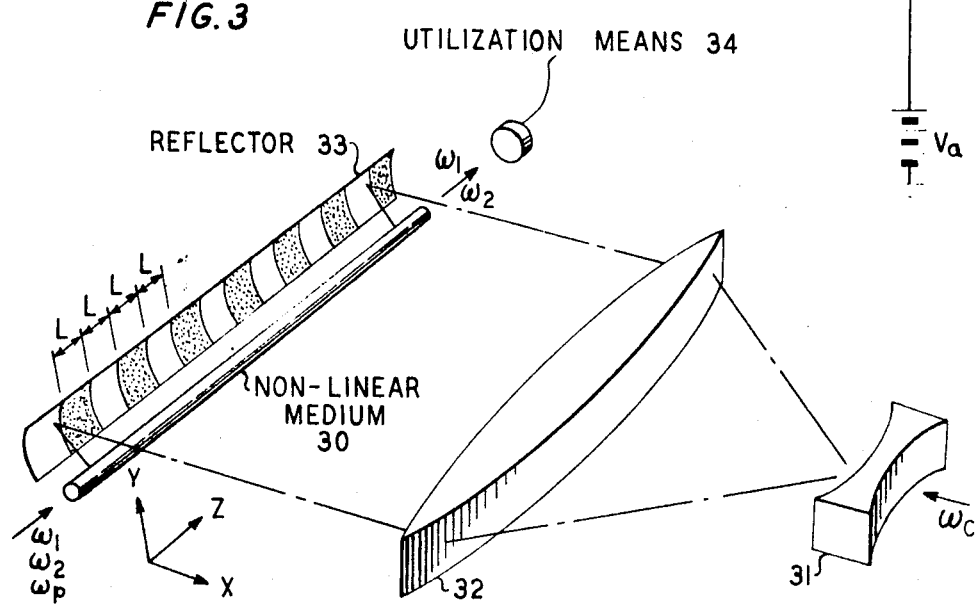
FIG. 3 is a perspective pictorial view of a parametric device according to another embodiment of this invention.

While FIG. 1 shows the use of a first pump in the optical region of the spectrum with a second pump $V_c$ which is typically not adapted for frequencies $\omega_c$ in the optical region (or higher) of the spectrum, FIG. 3 shows the use of two pumps, both of which are typically in optical region of the spectrum.

A laser or other powerful optical source (not shown) furnishes the first electromagnetic pump wave of angular frequency $\omega_p$, typically in the visible region of the spectrum. This wave is incident upon the near end of the nonlinear medium 30, KTN for example, in the form of a circular cylindrical dielectric rod. Also, the optical signal wave of angular frequency $\omega_1$ to be amplified is incident upon the near end of the nonlinear medium 30. Both $\omega_p$ and $\omega_1$ are fed into the medium 30 so that these waves propagate longitudinally therethrough. Advantageously, the nonlinear medium 30 is a dielectric rod having a geometric design which furnishes a significant waveguiding of these electromagnetic waves $\omega_p$ and $\omega_1$ propagating therethrough, as known in the art of dielectric waveguides. See, for example, George C. Southworth, Principles and Applications of Waveguide Transmission, D. Van Nostrand Inc. (1950), Section 5.7 and 10.3 Thereby, the effective wave propagation constants $k_p$ and $k_1$ of the pump wave and the signal wave in the medium 30 will in general be significantly different from their respective values in bulk material.

The second electromagnetic pump wave of frequency $\omega_c$, typically in the infrared portion of the optical spectrum, is fed into the medium 30 by means of the indicated lenses 31, 32 and the reflector 33. In this way, mutual and distributed coupling of $\omega_c$ with both $\omega_1$ and $\omega_p$ is obtained in the medium 30. Advantageously, the cross section width of the medium 30 is of the order of the wavelength of the pump $\omega_c$, in order to obtain better utilization of this cross section. An idler wave of frequency $\omega_2$ and wave propagation constant $k_2$ is generated in this medium provided there exists such a wave which satisfies the parametric relations eqs. (4) and (5) above. Now, however, $k_n$ arises by virtue of the spatial periodicity in the alternating regions, each having a length L, of reflection and absorption along the reflector 33. Moreover, $k_n$ satisfies eq. (2) above with this latter realization of L. In addition, or as an alternative to the foregoing alternating regions in structure of the reflector 33, the value of $k_n$ can be controllably varied in order to satisfy eq. (5) simply by varying the angle of incidence of the $\omega_c$ wave with respect to the normal to the axis of the dielectric rod 30, or by varying the orientation of the axis of the reflector 33 with respect to the axis of the rod 30. In any event, provided that an idle wave can exist in the rod 30 which satisfies the parametric relations (4) and (5), the signal wave $\omega_1$ will be amplified in the rod 30 and will exit therefrom from the far end of the rod. Then the amplified signal wave $\omega_1$ is collected for use by the utilization means 34.

The arrangements shown in both FIG. 1 and FIG. 3 can also be used for the parametric process of frequency conversion, of wave energy with frequency $\omega_p$ into wave energy with frequency $\omega_2$ for example, merely by omitting the signal input wave of frequency $\omega_1$. In such cases, in the parametric relation (4) and (5) to be satisfied, the terms $\omega_1$ and $k_1$ will merely be absent. In any event, the utilization means 13 or 34 are adapted to receive and utilize that output from the nonlinear medium 10 or 30 corresponding to the parametric process being utilized. In the parametric process of frequency down-conversion, for example, the utilization means 13 or 34 is adapted to utilize outputs of frequency equal to $\omega_p - \omega_c$, the "idler" wave in this case.

It should be understood in all cases that the polarization of the electric vector in the pump wave $\omega_p$ should be such that it has a significant component which mutually couples in the nonlinear medium with the electric fields associated with the wave $\omega_c$, $\omega_2$, and $\omega_1$ (if any). See, for example, U.S. Pat. No. 3,384,433 issued to N. Bloembergen on May 21, 1968.

Although this invention has been described in detail with reference to an optical pump frequency $\omega_p$, the invention may be practiced with pumps in other regions of the electromagnetic spectrum. Advantageously, in any event, the pump wave $\omega_p$ is fed into the nonlinear medium 10 or 30 such that the wave $\omega_p$ propagates in the respective medium in the lowest order mode, as known in the art. See, for example, George C. Southworth, Principles and Applications of Waveguide Transmission, Section 10.3, D. Van Nostrand Inc. (1950). This permits fuller utilization of much longer regions of nonlinear interaction, by holding the fields within a relatively small transverse cross-sectional area. The index of refraction of the medium can have a continuous or discontinuous transverse variation (that is, in the $x$ and $y$ directions of FIGS. 1 and 3) of refractive index in response to the waves propagating therein. In this way, a significant dielectric waveguiding effect is thereby achieved, as desired in order to help satisfy the parametric relations embodied in eqs. (4) and (5) above.

Finally, it should be noted that more than two pumps can be used in this invention, in which case the parametric relations (4) and (5) above will contain the added term(s) corresponding to the added pump(s). In addition, the "idler" wave $\omega_2$ may also be stimulated in the medium by an independent source thereof which feeds this idler into the medium 10 or 30.

What is claimed is:

1. In a parametric device, including a nonlinear electrooptic solid medium and further including an input signal wave, an idler wave, and a first input optical pump wave:

means for applying to the medium a second input pump which is mutually and distributedly coupled both with the signal wave, the idler wave, and with the first pump wave in the medium, such that the parametric relations of frequencies and of propagation constants are simultaneously satisfied in the medium for the said signal wave, idler wave, first pump wave, and second pump, said medium characterized by a transverse distribution of refractive index which furnishes a significant waveguiding of at least one of the waves propagating in the medium.

2. The device recited in claim 1 in which said means include means for establishing an AC electric field in a second direction perpendicular to the direction of propagation of the first wave in the medium, said medium having a geometric boundary which furnishes significant waveguiding of at least one of the waves propagating in the medium.

3. The device in claim 2 which further comprises means for applying a spatially periodic DC electric field in the second direction.

4. The device in claim 1 in which said means include an optical source of the second pump, the medium being located in the path of the radiation from the optical source.

5. The device in claim 4 in which the second pump applies to the medium a second optical pump wave and in which is further provided means for focusing the second pump wave into the medium such that the intensity of the second wave in the medium has a spatial periodicity in the direction which is parallel to the direction of propagation of the first pump wave in the medium.

6. A parametric device which comprises:
a. a solid medium which is electrooptically nonlinear;
b. means for applying a first pump electromagnetic wave to said medium, said medium having a geometric boundary to form a cylindrical rod which furnishes a significant waveguiding of at least the first wave; and
c. means for applying a second pump electromagnetic wave to said medium and
d. means for applying an electromagnetic signal wave to said medium, such that the parametric relations of frequencies and of propagation constants are simultaneously satisfied between the signal wave, the first pump wave, the second pump wave and an idler wave in the medium, and such that the first and second pump waves, the signal wave, and the idler wave are mutually and distributedly coupled in the medium.

7. A parametric device recited in claim 6 in which the first and second pumps are waves in the optical region of the spectrum.

8. The device recited in claim 7 in which the first pump is in the visible and the second pump is in the infrared region of the spectrum.

9. A parametric device according to claim 8 in which there is further provided means for focusing the second wave into the medium such that the intensity of the second wave in the medium has a spatially periodicity in the direction which is parallel to the direction of propagation of the first pump wave in the medium.

10. A parametric device according to claim 6 in which the first pump is a first optical wave and the second pump is an AC electric field having a significant component perpendicular to the direction of propagation of the first optical wave in the medium.

* * * * *